(12) United States Patent
Strandell et al.

(10) Patent No.: US 7,860,532 B2
(45) Date of Patent: Dec. 28, 2010

(54) METHOD AND SYSTEM FOR INITIATING A COMMUNICATION FROM AN ARBITRARY DOCUMENT

(75) Inventors: Toni Strandell, Helsinki (FI); Tuomas Tammi, Helsinki (FI)

(73) Assignee: Nokia Corporation, Espoo (FI)

( * ) Notice: Subject to any disclaimer, the term of this patent is extended or adjusted under 35 U.S.C. 154(b) by 992 days.

(21) Appl. No.: 11/537,696

(22) Filed: Oct. 2, 2006

(65) Prior Publication Data
US 2008/0081662 A1 Apr. 3, 2008

(51) Int. Cl.
*H04B 1/38* (2006.01)
*H04M 3/20* (2006.01)

(52) U.S. Cl. .................... 455/557; 455/414.1; 455/420

(58) Field of Classification Search .............. 455/414.1, 455/420, 455, 464, 517, 557, 403; 709/217, 709/218, 229
See application file for complete search history.

(56) References Cited

U.S. PATENT DOCUMENTS

| | | | |
|---|---|---|---|
| 5,812,776 A * | 9/1998 | Gifford | 709/217 |
| 6,456,699 B1 * | 9/2002 | Burg et al. | 379/88.17 |
| 6,772,188 B1 | 8/2004 | Cloutier | |
| 7,272,639 B1 * | 9/2007 | Levergood et al. | 709/218 |
| 7,428,497 B2 * | 9/2008 | Agarwal et al. | 705/14 |
| 2004/0122951 A1 * | 6/2004 | Beck et al. | 709/227 |
| 2006/0233336 A1 * | 10/2006 | Tadanori | 379/142.06 |
| 2007/0005584 A1 * | 1/2007 | Feng et al. | 707/4 |

FOREIGN PATENT DOCUMENTS

| WO | 02087161 | 10/2002 |
|---|---|---|
| WO | 03090491 | 10/2003 |

OTHER PUBLICATIONS

International Search Report dated Apr. 2, 2008.
Written Opinion dated Apr. 2, 2008.

* cited by examiner

*Primary Examiner*—Sonny Trinh
(74) *Attorney, Agent, or Firm*—Alston & Bird LLP

(57) ABSTRACT

A document is requested using a browser of a computing device. The document is parsed, prior to rendering the document, for any contact data. Each contact data on the document is replaced with an activatable link that will allow a user to activate the link on the computing device to automatically initiate a communication, from a mobile device in communication with the computing device, to a contact associated with the contact data.

34 Claims, 15 Drawing Sheets

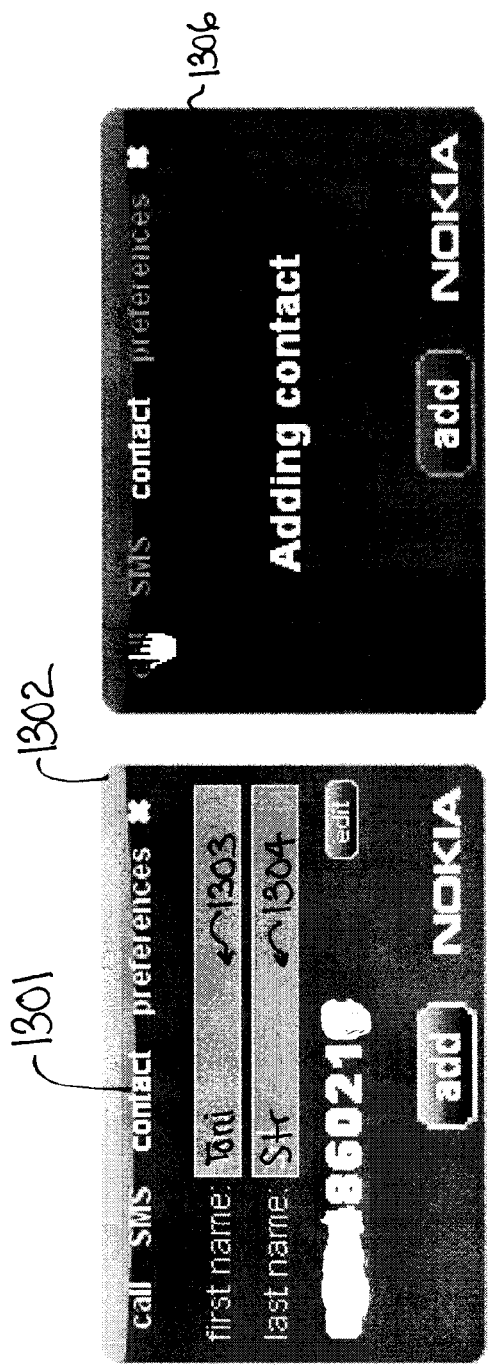
FIG. 13A
FIG. 13B
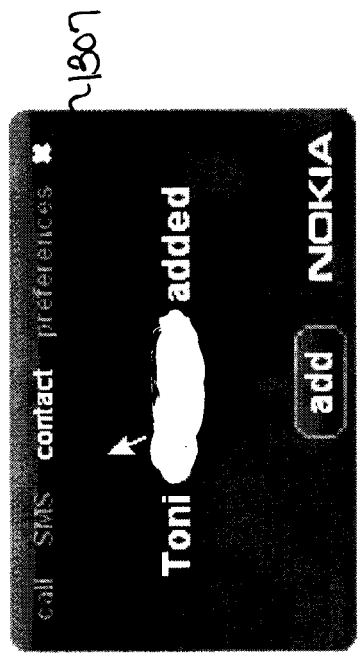
FIG. 13C

METHOD AND SYSTEM FOR INITIATING A COMMUNICATION FROM AN ARBITRARY DOCUMENT

BACKGROUND

1. Field

The disclosed embodiments generally relate to communications between a mobile device and a recipient, and in particular to, communications between a mobile device and a recipient using contact information extracted from a document.

2. Brief Description of Related Developments

When a user is browsing the Internet with a browser on his PC, and sees a phone number on a web page, for example, and desires to place a voice call or send an SMS to that number using a mobile device, the user must manually enter the number into the mobile device, even though using the PC for the selected task would be less interruptive.

It would be advantageous to be able to establish a communication with a party using contact data extracted from a document, without the need to manually manipulate the mobile device. For example, it would be advantageous to place a call to a number extracted from a document viewed on one device using the user's mobile device, or to send SMS to the contact, or to store the number as contact information in a mobile device, without the need to manually manipulate the mobile device.

SUMMARY

In one embodiment, a document is requested using a browser of a computing device. The document is parsed, prior to rendering the document to the computing device, for any data or information that comprises contact information. Each item of contact information is replaced with an activatable link that will allow a user to automatically initiate a communication to the contact associated with the contact information from the computing device via a mobile device.

In another aspect, the disclosed embodiments related to a method. In one embodiment, the method includes selecting an action from a link on a user interface of a computing device, the action being a request for action from a mobile device, calling a web page from a server running in the mobile device, and automatically executing a program in the mobile device in response to the page call, the executing program performing the requested action.

BRIEF DESCRIPTION OF THE DRAWINGS

The foregoing aspects and other features of the embodiments are explained in the following description, taken in connection with the accompanying drawings, wherein:

FIGS. 13A-13C are screen shots of examples of a contact add function in a system incorporating features of the disclosed embodiments.

DETAILED DESCRIPTION OF THE EMBODIMENT(S)

Figure 1A:
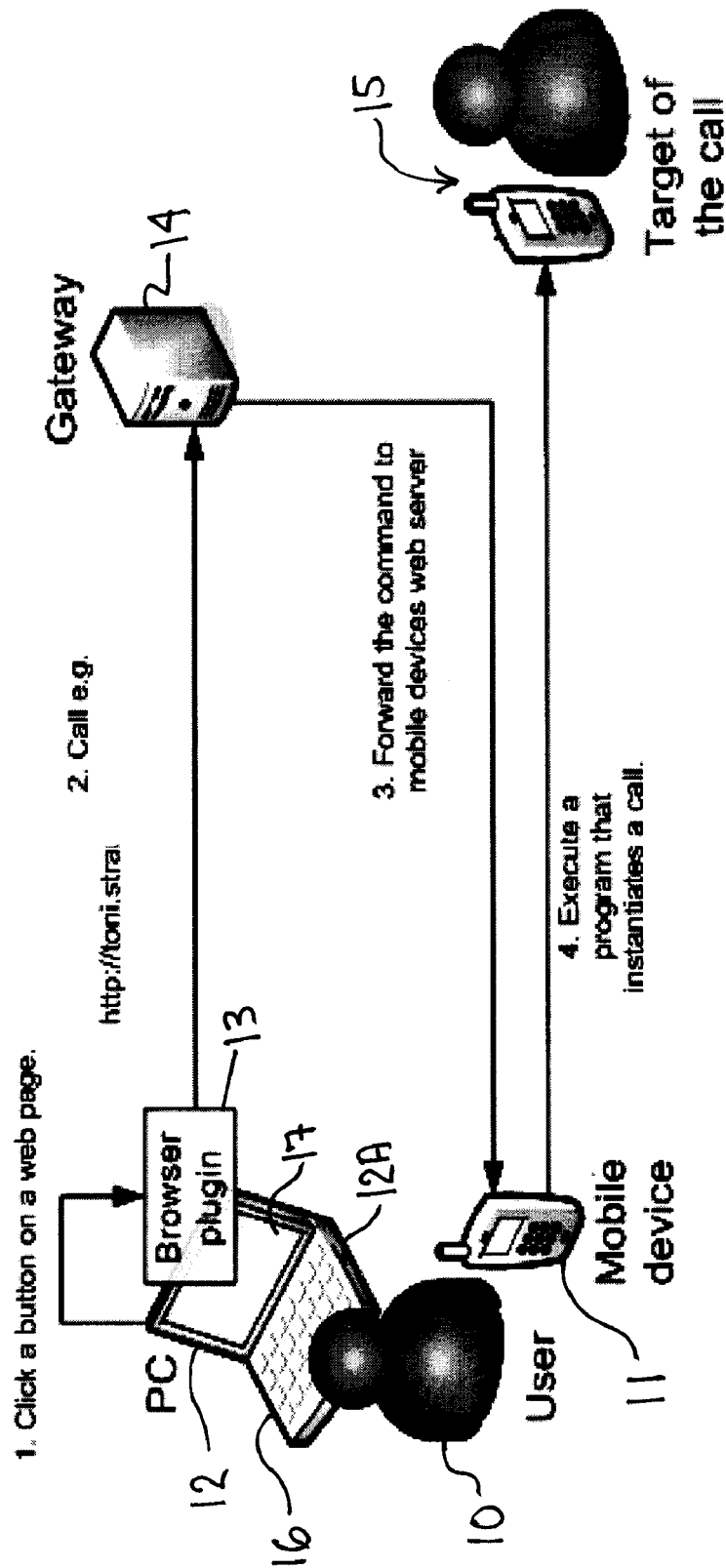
FIG. 1A shows a schematic illustration of a system, as an example of an environment in which aspects of the embodiments may be applied.

Referring to FIG. 1A, a system 100 is illustrated that can be used to practice aspects of the disclosed embodiments. Although aspects of the invention will be described with reference to the embodiments shown in the drawings and described below, it should be understood that these aspects could be embodied in many alternate forms of embodiments. In addition, any suitable size, shape or type of elements or materials could be used.

The disclosed embodiments generally allow a user 10 of a device 16 to extract contact information from a document or web page and automatically establish a communication link and/or communicate with the contact corresponding to the contact information via a mobile device 11 without any need to manually manipulate of the device 11. The contact information or data is not limited to any particular type of contact information, and can include for example, a telephone number, a mobile device number, or an email address. In alternate embodiments, and suitable contact information subject or data can be used. While the disclosed embodiments are described herein with reference to information from a web site or a "web page", it should be understood that a "web page" can include any suitable information document, file or format, such as for example, text document(s), spreadsheet(s), graphics presentation(s), powerpoint presentation(s), PDF document(s), multimedia files and documents or any other suitable information presentation format. In alternate embodiments, the disclosed embodiments relate to any machine that is capable of responding to requests from remote devices, such as for example readers and browsers. In one embodiment, a browser is used to request information from a network, such as for example, the Internet. This information can comprise any suitable information that might be stored or found, such as for example, a document or file. This information, which will generally be referred to as documents herein, can include any information that might be made available, on for example, the Internet or World Wide Web ("WWW"), and can include text, images, graphics, photographs, video or other multimedia information. A reader can read and deliver documents from environments other than including the Internet or WWW.

As an example, in one embodiment, a phone number appearing in a document or web page is automatically converted into an activatable call link, icon, or button for example, that appears on a display 17 of the device 16. The contact data can be replaced with a clickable element that can affect the internal representation of the data, within the browser, as well as the rendered output as view by the user. In alternate embodiments, the call link can comprise any suitable text, image, graphic, picture or symbol that can be used to represent an object, task or command and be rendered to a user. The user 10 does not need to manually input the phone number to the device 11, if the user desires to initiate a communication, such as placing a voice call to the contact. The user 10 can activate the communication link displayed on the user interface 12 of the computing device 16, and a suitable communication link with the contact will automatically be established by the mobile device 11. For example, if the user 10 desires a voice call, the mobile device 11 will be commanded to make the call. If the user 10 desires to send an SMS, the message information can be established on the device 16 and sent to the mobile device 11 for transmission to the contact. The mobile device 11 will establish communications with the contact in any suitable or compatible manner.

The link and pathway between the computing device 16 and the mobile device 11 can be any suitable communication and data pathway, and can include both hardwire or wireless communication pathways. While the examples herein will generally be described with reference to establishing a voice call with the mobile device 11, in alternate embodiments, the user 10, any suitable communication can be established, such as for example, writing and sending short message services (SMS) via the call link. If the contact information is an email address, in one embodiment, the email address is automatically converted into an activatable link and an email message can be prepared and transmitted via the mobile device 11.

The contact information that is extracted from the document or page can be in any suitable format or protocol. For example, in one embodiment, instant messaging user names and screen names can be recognized and extracted as contact information. The scope of the disclosed embodiments is not to be limited by the particular protocol or format of the contact data and information.

Referring to FIG. 1A, a user 10 browses a network, such as for example the Internet or WWW, using a browser or browser plug-in 13 on a computing device 16, such as for example a personal computer (PC). While the disclosed embodiments are described herein and obtaining the document or web page from a network, the document can be obtained from any suitable medium. The browser used will generally comprise a browser with the described functionality built-in or a browser with a plug-in installed that implements the described functionality. The term "browser" or "browsing" is used in a known sense herein, to generally mean or refer to software that allows a user to move from one web page or web site to another, and further allows documents from the World Wide Web and the Internet to be displayed. The term "browser plug-in" is generally used to refer to one or more programs that can be installed to add one or more features or functions to a browser, such as for example, a Web browser. Although the terms "browser" and "browser plug-in" are used herein, the scope of the disclosed embodiments are not intended to be limited by the use of such terms, and in alternate embodiments, any suitable program(s), device(s) or systems that provide the capability to "surf" the Internet, view and retrieve documents and web pages, and add features to such programs or systems, can be used.

The user 10 can instruct or request the browser 13 to download data or information, such as from the Internet, which commonly is in the form a document, file or web page of a web site. The form of the data, files or information that can be obtained, retrieved or downloaded is not to be considered limiting as to the scope of the disclosed embodiments. In alternate embodiments, the user 10 can utilize any suitable system or devices to download information and data from, from example a network. For example, in one embodiment, before a web page is rendered to the browser's user interface, which in the example of FIG. 1A is the computer 16, all the contact information on the web page is extracted. The browser 13 is instructed to render the extracted contact information as links or buttons on a display 17 of the user interface 12 of the computing device 16. In alternate embodiments, the web page or document can first be rendered to the user's device 16 and the contact information extracted afterwards.

If the user selects or clicks on one of the extracted contact information, which is displayed in any suitable or desired representation, the browser 13 sends a command to a gateway or web server 14 running on the user's mobile device 11, instructing the mobile device 11 to initiate or place a call. While this can be a voice call, in one embodiment, the mobile device 11 can be instructed to send a SMS to the selected number or target 15 of the call.

In one embodiment, when a browser loads a web page, the browser creates an internal representation of the web page, a DOM (Document Object model). In one embodiment, the web page contents are modified by locating potential contact information, such as for example, phone numbers, and adding necessary DOM elements and event handlers to make the located numbers "clickable" or activatable. In one embodiment, the contact information that is extracted could be presented as a link, icon or button or some other element with a "click" event handler. In alternate embodiments, the contact information can be presented in any suitable format that allows a user to easily and efficiently establish a communication. It is a feature of the disclosed embodiments to allow a user to establish a communication, such as for example a phone call, without the need to manipulate the mobile device by dialing numbers, for example. In one embodiment, one or more icons, symbols or button(s) could be inserted near or adjacent to the contact information.

When or after a call is initiated, the call button or link on the user interface 12 of the device 16 can be replaced with another suitable function, such as for example, a hang-up or communication termination icon, button or link. Clicking or activating this button or link during the call can cause, for example the voice call to be dropped and/or the link or pathway terminated. In alternate embodiments, the functionality of the link can be configured for any suitable function, such as for example, call answer, call hold, muting or redial.

The communication and communication link between the browser 13 and the mobile device can be a secure communication link, using any suitable secure communication link protocol. It is desirable to maintain secure access to the communications and communication link and authorized communications and authorized users should be permitted access to and allowed to make calls using the mobile device 11. For example, if the communication link is via a Bluetooth communication protocol, a pairing sequence between the two devices may be required. In one embodiment, HTTP basic authentication can be used. For example, a username/password is sent as plain text over the web. If the server supports for example, Secure Sockets Layer (SSL), encrypted connections can be used. In another embodiment, an encryption mechanism can be used that encrypts the commands sent to the mobile device. For example, while setting up the mobile device, the mobile device could generate an encryption key that the user would insert to plug-in preferences. The communication between the plug-in to the mobile device would be encrypted using this key, and only the mobile device would have the private key to decrypt the messages. In alternate embodiments, any suitable communication protocol and security between the computing device 12, browser 13 and the mobile device 11 may be used that insures that data on the network or link is protected from unauthorized use or access.

Figure 1B:
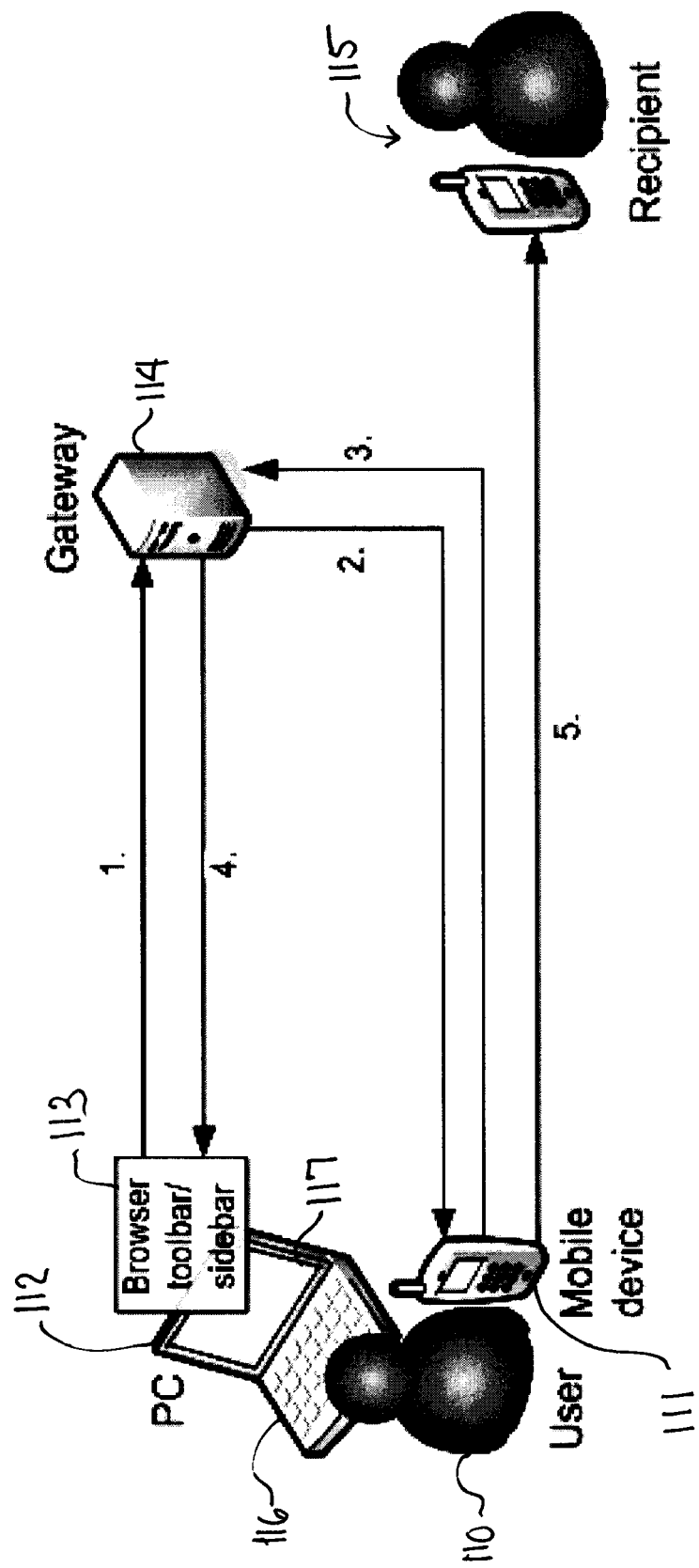
FIG. 1B shows a schematic diagram of another embodiment of a system in which aspects of the disclosed embodiments may be applied.
Figure 2:
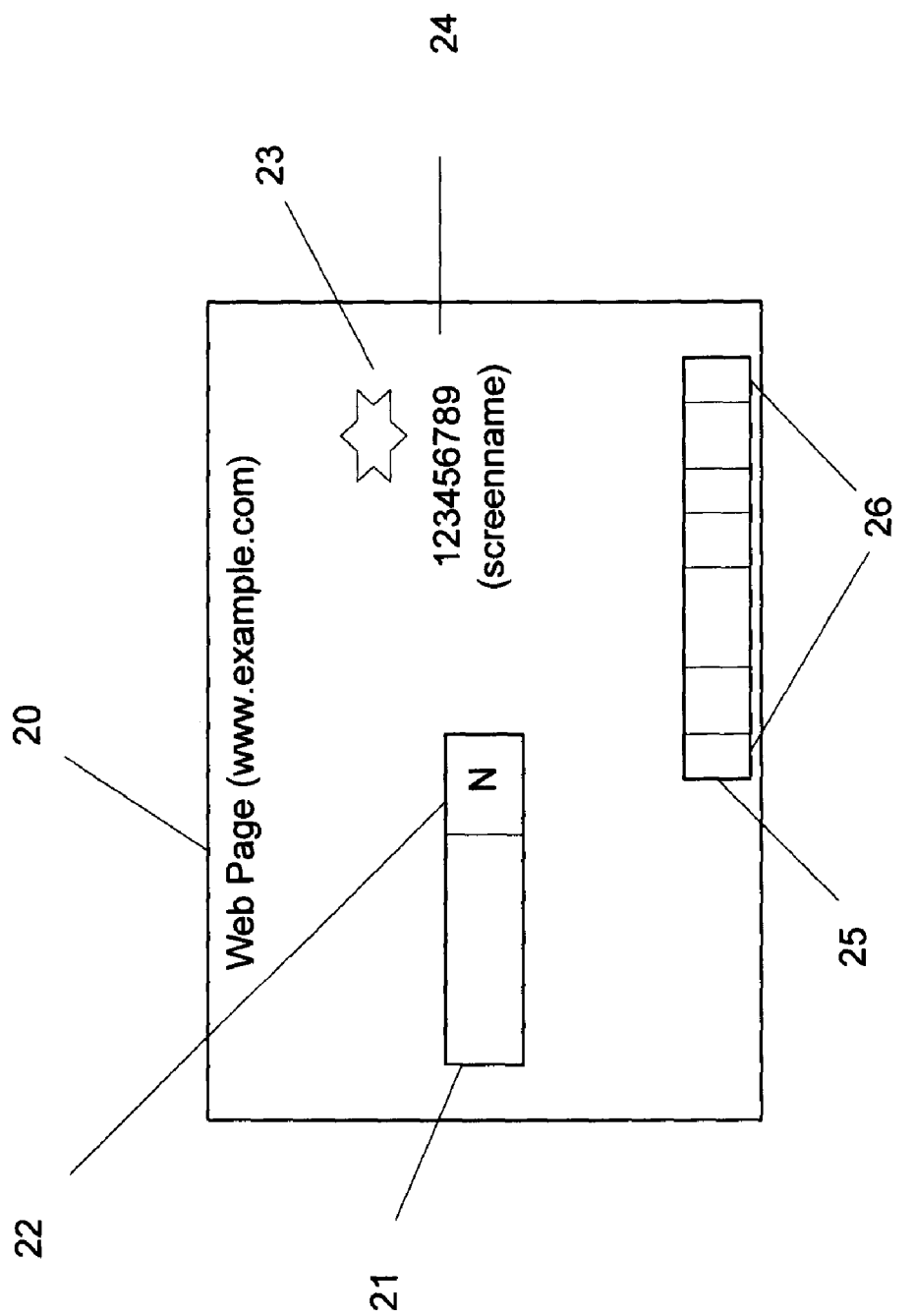
FIG. 2 illustrates an example of a display of a device incorporating aspects of the disclosed embodiments.

Referring to FIG. 2., the disclosed embodiments can allow the user to send for example, a SMS, and MMS, email or other suitable communication with the device to the contact associated with the contact information 24. For example, if the user elects to send an SMS to the selected number 24, in one embodiment, a text input field 21 is rendered to the web page 20 or user interface 12 of FIG. 1. The user 10 can select to send an SMS using any suitable mechanism. In one embodiment, the user 10 can insert text into the text input field 21 using for example, the keyboard 12A of the computing device 16. The text input field 21 can have a character 22 calculating component, informing the user of the number of remaining characters that may be inputted.

In one embodiment, when sending for example, a SMS, when the user clicks the contact information, a dialog or temporary window can be rendered (i.e. layer) on top of the page. The dialog can provide the SMS input field and a button to send the SMS. When the send-SMS button is pressed, the text and the target number are sent to the mobile device, which then actually sends the message.

The browser plug-in component 13 of FIG. 1A can include other services as well, such as for example, adding the selected phone number to user's mobile device contact database. For example, in one embodiment, when the user 10 activates the call link 23 of FIG. 2, the telephone number 24 associated with the call link 23 is stored to a contacts application (not shown) of the mobile device 11. In one embodiment, if a contact number is located in the document, the contact number can be compared with a contact's application of the mobile device and any additional communication contact data can be retrieved. For example, if a phone number is located on a web page, the phone number can be compared with the data in the contact phonebook of the mobile device 11. If an email address or other contact data is found, the user can choose one of these communication pathways to communicate with the contact, other than the phone number. In another embodiment, if contact data is located in the document, such as for example a phone number, the contact data can be compared with the contact application of the mobile device 11, and any found contact identification data can be displayed. For example, if a phone number is located, the phone number is compared to the contacts application of the device 11, or in one embodiment, the device 16. If a user name, for example, is matched to the phone number, the user name can be displayed. In alternate embodiments, any suitable information can be displayed, such as for example, a picture, image or a link to an audio or other multimedia file that provides identifying information. In one embodiment, a link may be displayed that provides a pop-up of contact information and/or contact options when the cursor or mouse is at or near the link. Then, if the user wants to communicate with the contact, the user can click on the icon on the user interface 12 of the device 16. The device 16 will establish a link to the mobile device 11. If the communication is a voice call, the mobile device 11 will establish a suitable voice communication. In one embodiment, the user 10 may use, for example an earpiece, earbud or headset, whether hardwire or wireless, coupled to the mobile device 11, to be able to participate in a voice call. If the communication is an email or text message, the user 10 can create the email or text message on the device 16, and the click on the icon to establish a suitable communication link. In one embodiment, a link for sending the message is first established between the computing device 16 and the mobile device 11, and then the email is sent by the mobile device 11.

In one embodiment, the software the mobile device runs can be specific server software that listens to incoming connection requests, or web server software, such as for example, NOKIA Mobile Web Server. Using for example web server software, the mobile device 11 can create a suitable communication connection to an interface or node 14, that provides an entrance and exit into a communications network. For example, the mobile device 11 can create a GPRS, 3G, WLAN, Bluetooth, cable connection or such similar protocol connection to the gateway machine 14.

In one embodiment, the node gateway machine 14 assigns a web address, such as for example, a Uniform Resource Identifier ("URI") to the mobile device. Retrieving a specific web page under this URI causes a program to be run on the mobile device 11, which can, for example, place a voice call or send an SMS.

Figure 3:
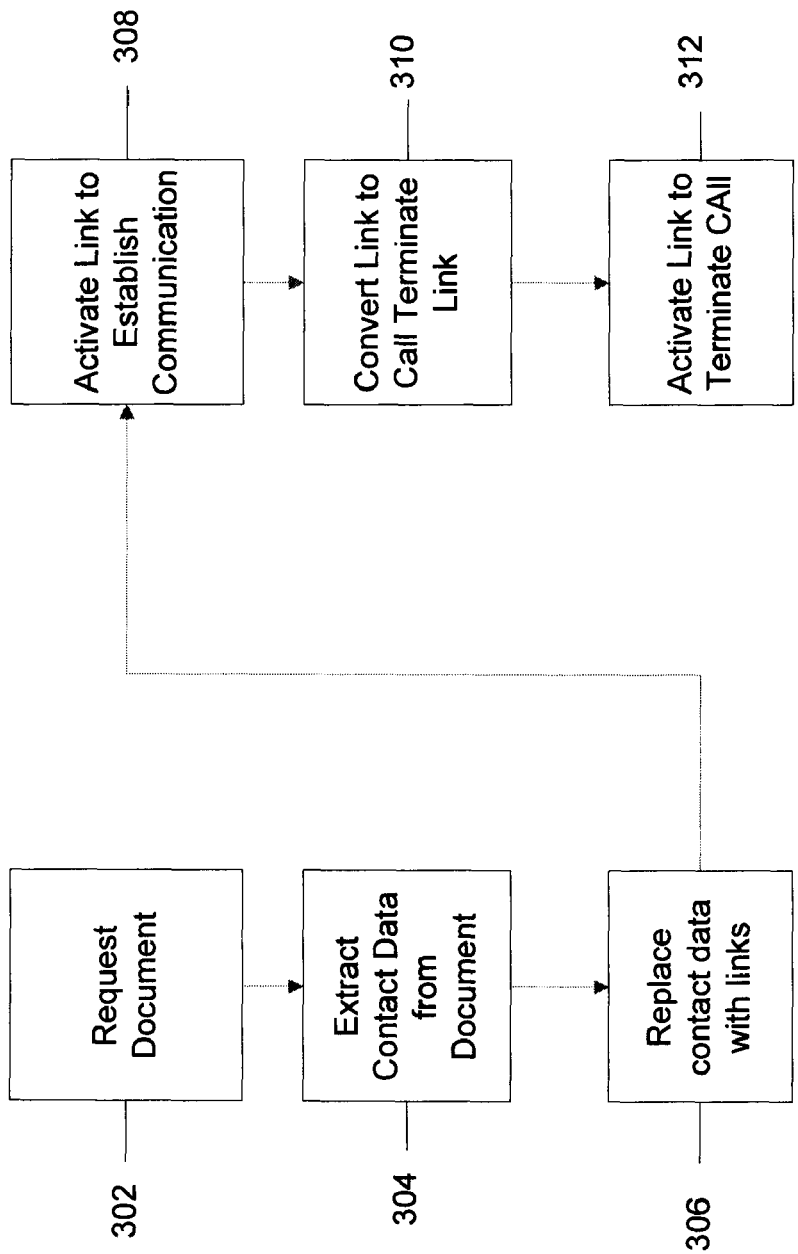
FIG. 3 illustrates a flow diagram of a method in accordance with the disclosed embodiments.

Referring to FIG. 1A, in one embodiment, the browser plug-in component 13 is installed to the user's computing device browser. This plug-in component 13 is configured to handle all documents and/or web pages retrieved with the user's computing device browser and replace phone numbers with buttons or links to call or send an SMS. For example, referring to FIG. 3, in one embodiment the user initiates or requests 302 the retrieval of a web page from the Internet. The request 302 can be generated by web browser of the user's computing device 16 of FIG. 1A. Before the requested web page is rendered or displayed on the user's computing device 16, the browser plug-in 13 extracts 304 all phone numbers from the requested web page. The browser plug-in 13 determines the presence of the phone numbers in any suitable manner. In one embodiment, determining the presence of contact information, such as a phone number for example, can comprise extracting number sequences that are potentially phone numbers. In alternate embodiments, any suitable process can be used to detect the presence of contact information.

In one embodiment, the browser plug-in 13 will replace each contact information on the page with a link 306 that can be activated by the user, for example. The link can comprise any suitable activatable link, such as for example an icon, button, hyperlink or hypertext link. The link, such as icon 23 of FIG. 2, allows the user to activate 308 the link 23 in any suitable manner, such as for example "clicking" on the icon, to initiate a communication. The communication can comprise a voice call or a SMS. In alternate embodiments, any suitable communication can be initiated. In one embodiment, after the call is initiated, the link 23 can be converted into or replaced 310 by a call termination link. When the user 11 decides to end the call, clicking or activating 312 the call termination link will cause the call connection to be dropped or terminated.

Figure 4:
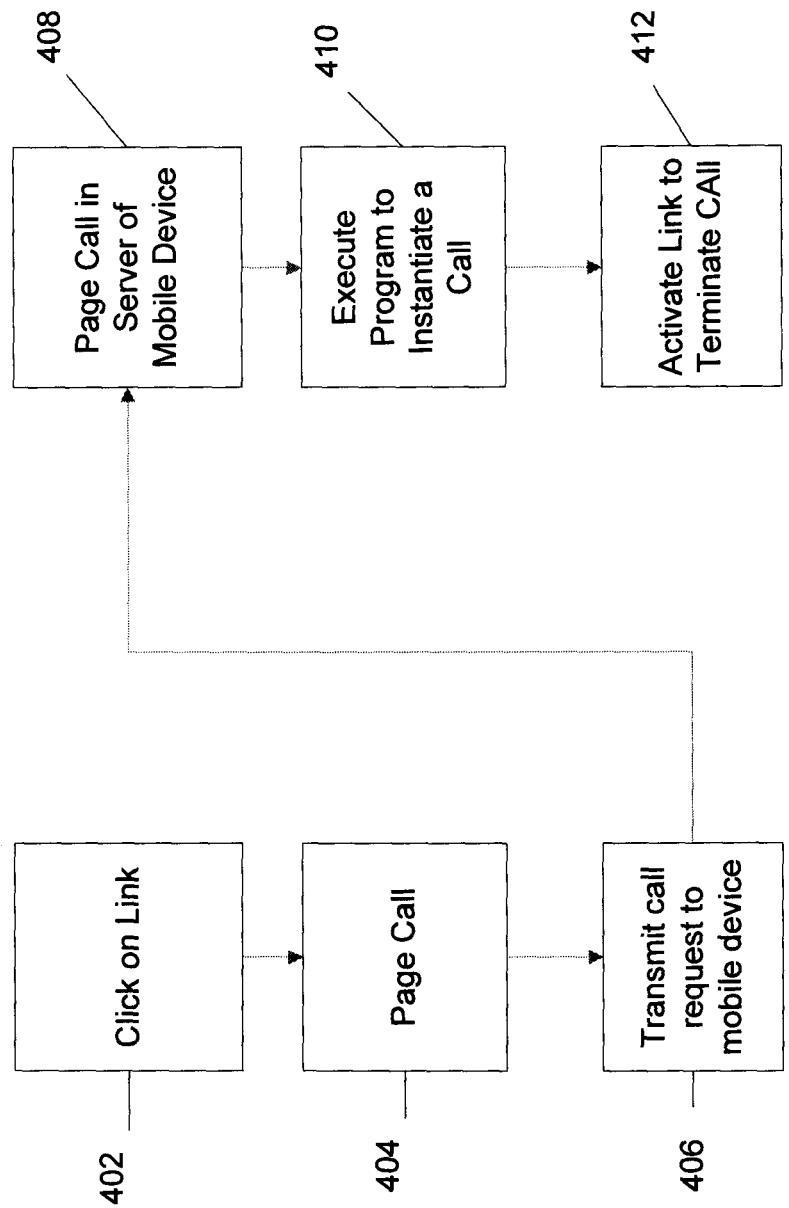
FIG. 4 illustrates a flow diagram of a method in accordance with the disclosed embodiments.

Referring to FIG. 4, in one embodiment, clicking 402 one of the buttons or links 23 on the web page 20 causes the browser plug-in 13 of FIG. 1. to call 404 a specific web page on the mobile phones web server of device 11. The server on the mobile device 11 can be for example, a web server, in which case an action or call is a request for a web page, with appropriate parameters. If the server on the device 11 is not a web server, then the call or actions are communications with the server to pass the parameters in. In one embodiment, the call to a specific web page can be implemented by inserting for example, a JavaScript, or such other suitable client side code or scripting, handler code to the buttons or links inserted to the web page. The call 404 to the web page can then be transmitted 406 via a proxy machine or gateway 14 to the user's mobile device 11. In one embodiment, the machine or gateway 14 can be located within the operator's interface between the cellular network and the Internet, so it is the operator that transmits the call to the web page.

A page call 408 in the server of the mobile device 11 can cause a program to be executed 410 in the mobile device that instantiates a call, for example. This can comprise either calls to the selected number or sending an SMS to the selected number, depending on the user's selection on the web page 20. In one embodiment, the URI and any needed authentication information, of the server in the user's mobile device 11 is stored in the browser plug-in 13 configuration information. The operation for terminating or ending a call is similar to initiating a call. For example, after the call is initiated, the link 23 is converted into a call termination link. When the user 11 desires to terminate or end the call, the user 11 activates 412 the link 23, which is now configured to function as a call termination link. In alternate embodiments, the link 23 can be configured to perform any desired or suitable functionality in conjunction with the extracted contact information and communication connection. In other embodiments, other service or function options of the mobile device 11 can be controlled through the browser 13, such as for example, changing the volume of the device 11 or turning the speaker of the device ON/OFF.

Referring to FIGS. 1B and 2, in one embodiment, a tool bar 25 (or sidebar) component can be installed to the user's PC web browser. In one embodiment, the browser tool bar component generally comprises a browser plug-in 113 that has a tool bar 25 or sidebar UI extension for the browser. In alternate embodiments, the tool bar component can be installed in any suitable fashion. The URI of the user's mobile device's web server is stored in the configuration information of the tool bar (or sidebar). When the user selects an action from the tool bar 25 (or sidebar) user interface, the tool bar (or sidebar) requests a specific action or web page from the web server running in the user's mobile device 111 via the gateway 114. Calling the action or page causes the web server to execute or initiate execution of a program on the mobile device 111, which performs the selected action. Parameters needed for the program execution are included in the called web page's URI.

As illustrated in FIG. 2, in one embodiment, the tool bar 25 (or sidebar) can be added to the browser's user interface (UI), which enables communicating and sending commands to the user's mobile device 111 from the computing device 116. The tool bar 25 generally comprises buttons or icons 26, or shortcut buttons, that provide quick access to commands, such as for example, enabling the user 110 to insert a phone number and call or send an SMS to the mobile device 111 from the computing device 116, or to add the number to the user's mobile device's contact database by clicking on one or more of the buttons. In the event the user 110 calls or sends an SMS to the number, the tool bar (or sidebar) component instructs the user's mobile device to place the call or send an SMS.

In one embodiment, the tool bar 25 can include for example, a text box for search strings and numbers to call and/or a button to activate a search. In one embodiment, a user may insert characters or numbers to start a search. Matching contacts could be listed in a drop-down menu. The user can select one and a dialog with the contact's details can appear. Controls might also be included to edit, call and send a SMS. The tool bar could also include a button to call/send SMS to a number entered in the text box, a searchable drop down menu to search existing contacts, a drop down menu for the latest SMS messages. For example, un-read or new messages might be highlighted and opening the menu can provide a list of the latest message senders. Clicking on a message can display its contents and controls to reply via SMS, a call to the sender, or add the sender to the contacts application.

The tool bar 25 can also include a drop down menu for a call log. Unanswered or missed calls can be identified and/or highlighted. Opening the menu might list the callers and the call time. Selecting one entry can open controls to call the contact, send a SMS, or add the number to the contacts application or database.

The tool bar 25 could also include a button to add a new contact or send a SMS, MMS, email or other suitable communication. In alternate embodiments, any suitable buttons can be added to or included in the tool bar for any suitable or desired service.

The tool bar 25 (or sidebar) can connect periodically to the user's mobile device 111 and retrieve information about received SMS and unanswered calls. If there are unread SMS or unanswered calls in the mobile device 111, the information is shown in the tool bar (or sidebar) on a display portion 117 of the user interface 112 of the computing device 116. In one embodiment, the user interface 117 displays controls to read the unread SMS, reply to it via SMS and to call to the sender of the SMS. For unanswered calls, the user interface 117 can display controls that allow the user to call the unanswered number or to send an SMS to the sender via the computing device 116.

The tool bar 25 (or sidebar) can include user interface components to execute different services, such as access the call log on the user's mobile device 111. Via these UI components the user 110 can see the recently called numbers in the browser tool bar (or sidebar). The user can call again to a selected number, add it to the mobile device's contact database, and send an SMS to the number, or perform a desired or suitable service.

In one embodiment, the user 110 can search for contacts in the mobile device 111 using the tool bar 25 (or sidebar) on the user interface 112 of the computing device 116. The user 111 inserts a search string into the user interface 117 of the computing device 116, such as first name, last name, phone number or other contact detail, or some letters or numbers from the beginning of a contact detail, and launches the search. The search string is sent to the user's mobile device 111, which returns a list of matching contacts. The user 110 can also view a list of all the contacts using the tool bar (or sidebar). The user 110 can edit the contacts' information, call or send an SMS to a selected contact, or delete the contact from the mobile device's contact database.

The user 110 can view received SMS from the mobile device's message database on the display portion 117 of the user interface 112 of the computing device 116 using the tool bar (or sidebar). The tool bar requests the received SMS from the user's mobile device 111 and displays the results to the user. The user 110 can reply to a message sender via SMS or place a call to the sender's phone number from the user interface 112 of the computing device 116.

The web server in the mobile device 111 constructs a reply to the request, and sends it back to the tool bar (or sidebar). The user's mobile device 111 can also place a call or send an SMS to the selected recipient 115. In one embodiment, referring to FIG. 1A, the reply request can also occur with the plug-in component 13. Each call from the plug-in component 13 sent to the mobile device 11 receives a reply that the mobile device 11 generates upon acting on or executing the instructions sent by the plug-in component 13.

Figure 5:
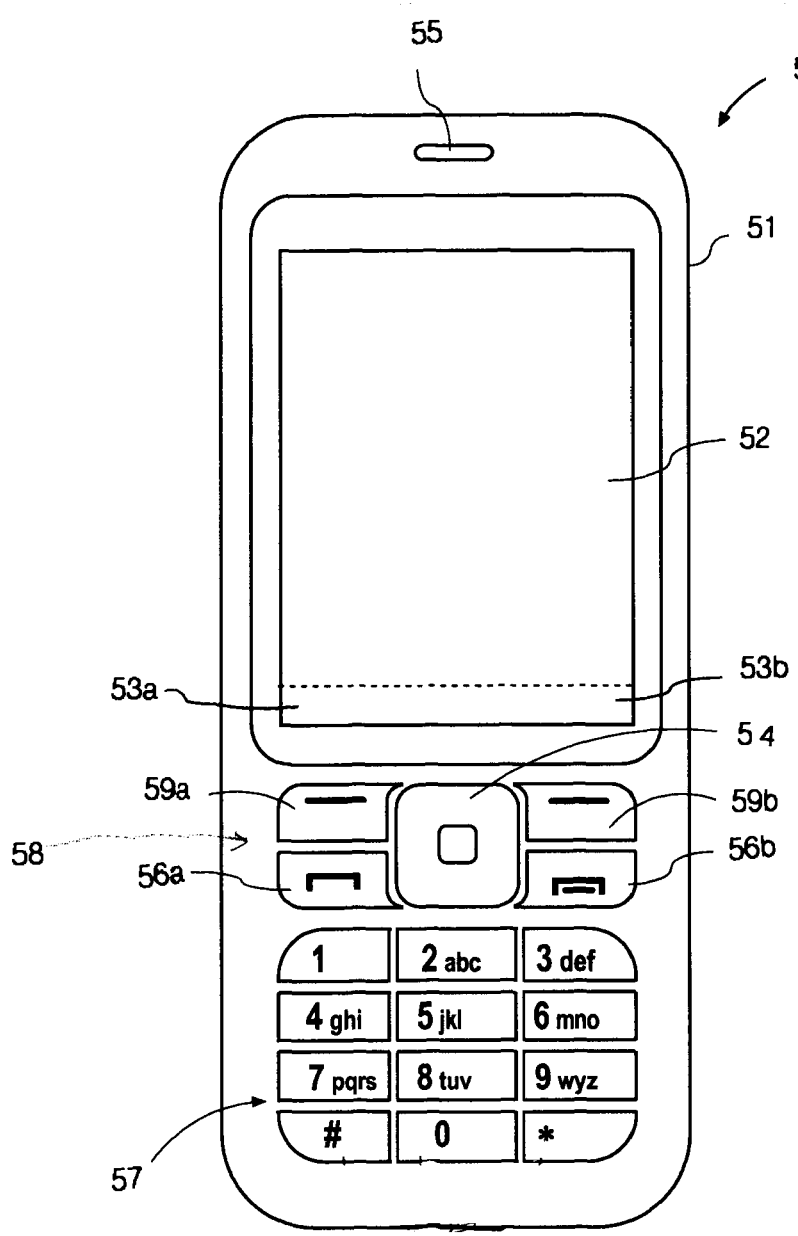
FIG. 5 is one example of a front view of a mobile device incorporating features of the disclosed embodiments.

The mobile device 11 of FIG. 1A can generally comprise any suitable electronic device, such as for example a personal computer, a personal digital assistant (PDA), a mobile terminal, a mobile communication terminal in the form of a cellular/mobile phone, or a multimedia device or computer. FIG. 5 illustrates one embodiment of the mobile device 11 of FIG. 1A. In alternate embodiments, the device 11 of FIG. 1A may be a personal communicator, a mobile phone, a tablet computer, a laptop or desktop computer, a television or television set top box or any other suitable device capable of containing for example a display 52 shown in FIG. 5, and supported electronics such as the processor 618 and memory 602 of FIG. 6. For description purposes, the embodiments described herein will be with reference to a mobile communications device for exemplary purposes only and it should be understood that the embodiments could be applied equally to any suitable device incorporating a display, processor, memory and supporting software or hardware.

Referring to FIG. 5, in one embodiment, the mobile device 50 generally comprises a user interface having a housing 51, a display 52, an on/off button (not shown), an audio output device 55 (only the opening is shown), and an audio input device (not shown). The mobile device 50 is generally adapted for communication via a cellular network, such as the GSM 900/1800 MHz network. In alternate embodiments, the mobile device is adapted for use on any suitable communication network, such as for example a Code Division Multiple Access (CDMA) network, a 3G network, or a TCP/IP-based network to cover a possible VoIP-network (e.g. via WLAN, WIMAX or similar) or a mix of VoIP and Cellular such as UMA (Universal Mobile Access).

Referring again to FIG. 5, in one embodiment the device 50 has a user interface that can include a user input device such as a keypad with first group of keys 57. The keys 57 can be alphanumeric keys and can be used for example to enter a telephone number, write a text message (SMS), or write a name (associated with the phone number). Each of the twelve alphanumeric keys 57 shown in FIG. 5 can be associated with a alphanumeric such as "A-Z" or "0-9", or a symbol, such as "#" or "*", respectively. In alternate embodiments, any suitable number of keys can be used, such as for example a QUERTY keyboard, modified for use in a mobile device. In an alpha mode, each key 57 can be associated with a number of letters and special signs used in the text editing.

The user interface of the mobile device 50 can also include a second group of keys 58 that can include soft keys 59a, 59b, call handling keys 56a, 56b, and a multi-function/scroll key 54. The call handling keys 56a and 56b can comprise a call key (on hook) and an end call (off hook). The keys 58 can also include a 5-way navigation key 54 (up, down, left, right and center: select/activate). The function of the soft keys 59a and 59b generally depends on the state of the device, and navigation in the menus of applications of the device can be performed using the navigation key 54. In one embodiment, the current function of each of the soft keys 59a and 59b can be shown in separate fields or soft labels in respective dedicated areas 53a and 53b of the display 52. These areas 53a and 53b can generally be positioned in areas just above the soft keys 59a and 59b. The two call handling keys 56a and 56b are used for establishing a call or a conference call, terminating a call or rejecting an incoming call. In alternate embodiment, any suitable or key arrangement and function type can make up the user interface.

In one embodiment, the navigation key 54 can comprise a four- or five-way key which can be used for cursor movement, scrolling and selecting (five-way key) and is generally placed centrally on the front surface of the phone between the display 52 and the group of alphanumeric keys 57. In alternate embodiments, the navigation key 54 can be placed in any suitable location on user interface of the device 50.

A releasable rear cover (not shown) gives access to the SIM card (not shown), and the battery pack (not shown) in the back of the device that supplies electrical power for the electronic components of the device 50.

The display 51 of the device 50 can comprise any suitable display, such as for example, a touch screen display or graphical user interface. In one embodiment, the display 51 can be integral to the device 50. In alternate embodiments the display may be a peripheral display connected or coupled to the device 50. A pointing device, such as for example, a stylus, pen or simply the user's finger may be used with the display 52. In alternate embodiments any suitable pointing device may be used. In other alternate embodiments, the display may be any suitable display, such as for example a flat display 52 that is typically made of an LCD with optional back lighting, such as a TFT matrix capable of displaying color images. A touch screen may be used instead of a conventional LCD display.

The device 50 may also include other suitable features such as, for example, a camera, loud speaker, connectivity port or tactile feedback features.

Figure 6:
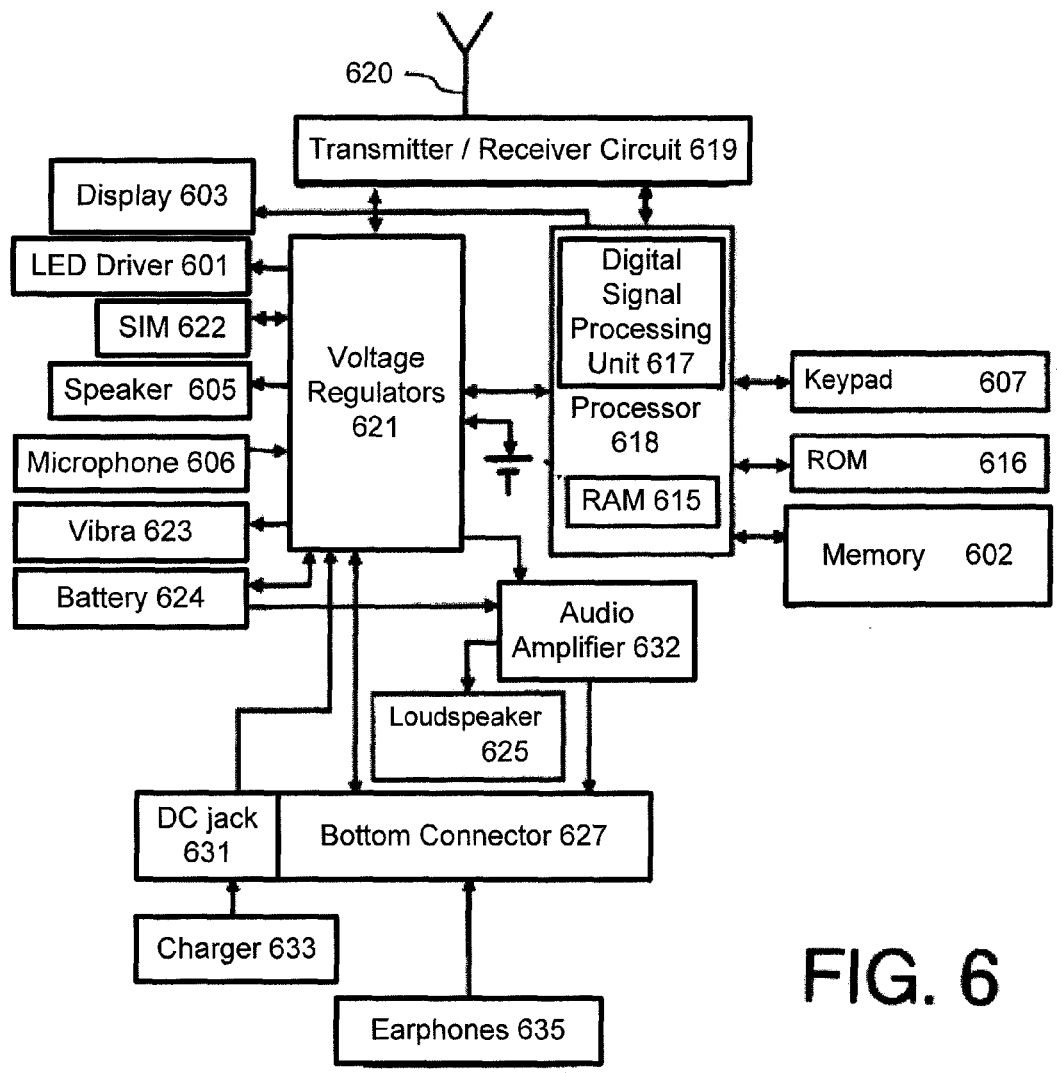
FIG. 6 is a block diagram illustrating the general architecture of the exemplary mobile device of FIG. 5.

FIG. 6 illustrates in block diagram form one embodiment of a general architecture of the mobile device 50. The mobile communications device 50 may have a processor 618 connected to the display 603 for processing user inputs and displaying information on the display 603. The processor 618 controls the operation of the device and can have an integrated digital signal processor 617 and an integrated RAM 615. The processor 618 controls the communication with a cellular network via a transmitter/receiver circuit 619 and an internal antenna 620. A microphone 606 is coupled to the processor 618 via voltage regulators 621 transforms the user's speech into analog signals. The analog signals formed are A/D converted in an A/D converter (not shown) before the speech is encoded in the DSP 617 that is included in the processor 618. The encoded speech signal is transferred to the processor 618, which e.g. supports the GSM terminal software. The digital signal-processing unit 617 speech-decodes the signal, which is transferred from the processor 618 to the speaker 5 via a D/A converter (not shown).

The voltage regulators 621 form the interface for the speaker 605, the microphone 606, the LED drivers 601 (for the LEDS backlighting the keypad 607 and the display 603), the SIM card 622, battery 624, the bottom connector 627, the DC jack 631 (for connecting to the charger 633) and the audio amplifier 632 that drives the (hands-free) loudspeaker 625.

A processor 618 can also include memory 602 for storing any suitable information and/or applications associated with the mobile communications device 50 such as phone book entries, calendar entries, etc.

The processor 618 also forms the interface for peripheral units of the device, such as for example, a (Flash) ROM memory 616, the graphical display 603, the keypad 607, a ringing tone selection unit 626, and an incoming call detection unit 628. In alternate embodiments, any suitable peripheral units for the device 50 can be included.

The software in the RAM 615 and/or in the flash ROM 616 contains instructions for the processor 618 to perform a plurality of different applications and functions.

Figure 7:
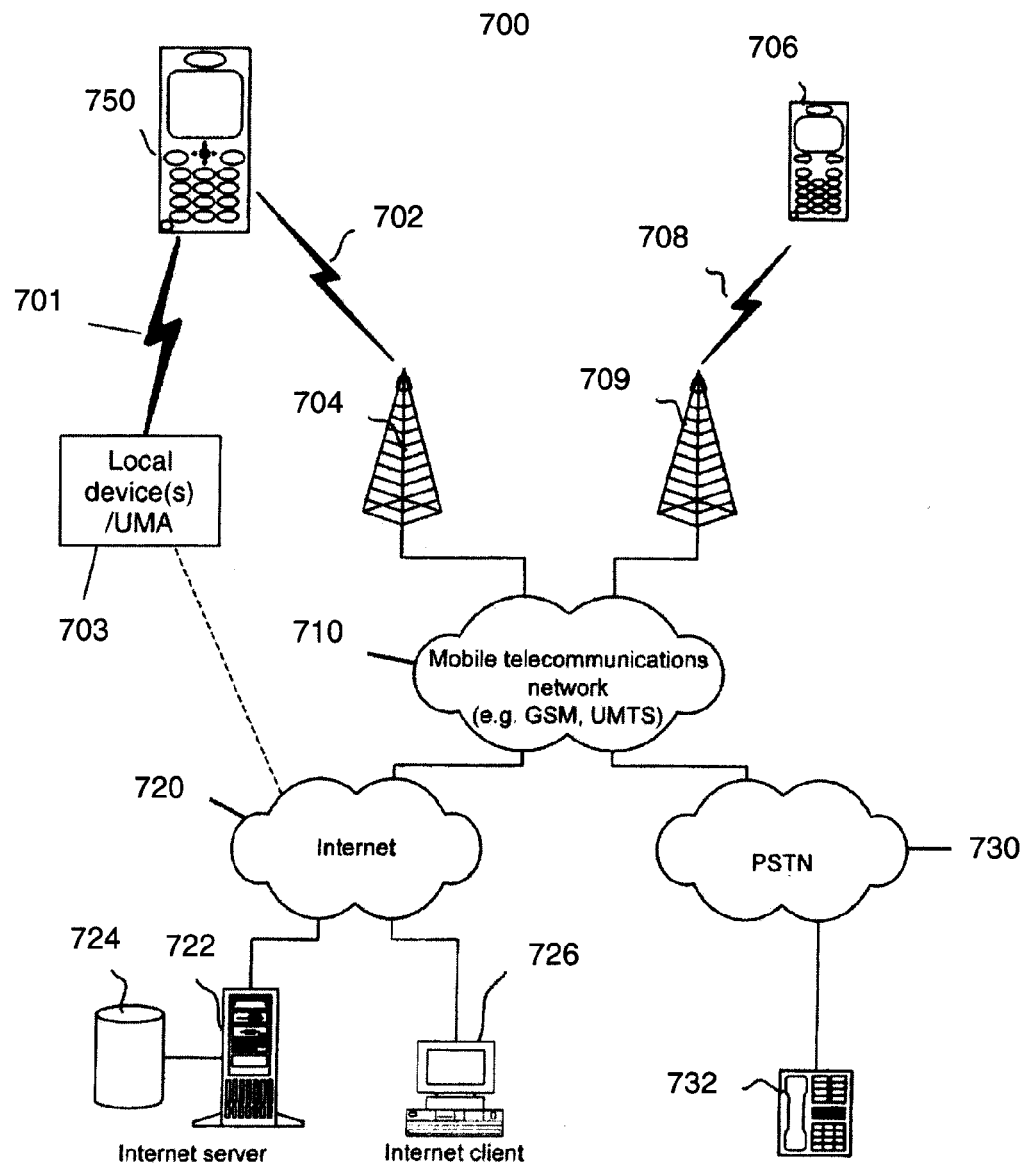
FIG. 7 illustrates one example of a schematic diagram of a network in which aspects of the disclosed embodiments may be practiced.

Referring to FIG. 7, one embodiment of a communication system in which the disclosed embodiments can be used is illustrated. In the communication system 100 of FIG. 7, various telecommunications services such as cellular voice calls, www/wap browsing, cellular video calls, data calls, facsimile transmissions, music transmissions, still image transmission, video transmissions, electronic message transmissions and electronic commerce may be performed between the mobile terminal 750 and other devices, such as another mobile terminal 706, a stationary telephone 732, or an internet server 722. It is to be noted that for different embodiments of the mobile terminal 750 and in different situations, different ones of the telecommunications services referred to above may or may not be available. The aspects of the invention are not limited to any particular set of services in this respect.

The mobile terminals 750, 706 may be connected to a mobile telecommunications network 710 through radio frequency (RF) links 702, 708 via base stations 704, 709. The mobile telecommunications network 710 may be in compliance with any commercially available mobile telecommunications standard such as, for example, GSM, UMTS, D-AMPS, CDMA2000, FOMA and TD-SCDMA or other such suitable communication standard or protocol.

The mobile telecommunications network 710 may be operatively connected to a wide area network 720, which may be the internet or a part thereof. An internet server 722 has data storage 724 and can be connected to the wide area network 720, as is for example, an internet client computer 726. The server 722 may host a www/wap server capable of serving www/wap content to the mobile terminal 700. In alternate embodiments, the server 722 can host any suitable transaction oriented protocol.

For example, a public switched telephone network (PSTN) 730 may be connected to the mobile telecommunications network 710 in a familiar manner. Various telephone terminals, including the stationary telephone 732, may be connected to the PSTN 730.

The mobile terminal 750 is also capable of communicating locally via a local link 701 to one or more local devices 703. The local link 701 may be any suitable type of link with a limited range, such as for example Bluetooth, a Universal Serial Bus (USB) link, a wireless Universal Serial Bus (WUSB) link, an IEEE 802.11 wireless local area network (WLAN) link, an RS-232 serial link, etc. The local devices 703 can, for example, be various sensors that can communicate measurement values to the mobile terminal 700 over the local link 701. The above examples are not intended to be limiting, and any suitable type of link may be utilized. The local devices 703 may be antennas and supporting equipment forming a WLAN implementing Worldwide Interoperability for Microwave Access (WiMAX, IEEE 802.16), WiFi (IEEE 802.11x) or other communication protocols. The WLAN may be connected to the internet. The mobile terminal 750 may thus have multi-radio capability for connecting wirelessly using mobile communications network 710, WLAN or both. Communication with the mobile telecommunications network 710 may also be implemented using WiFi, WiMax, or any other suitable protocols, and such communication may utilize unlicensed portions of the radio spectrum (e.g. unlicensed mobile access (UMA)).

Figure 8:
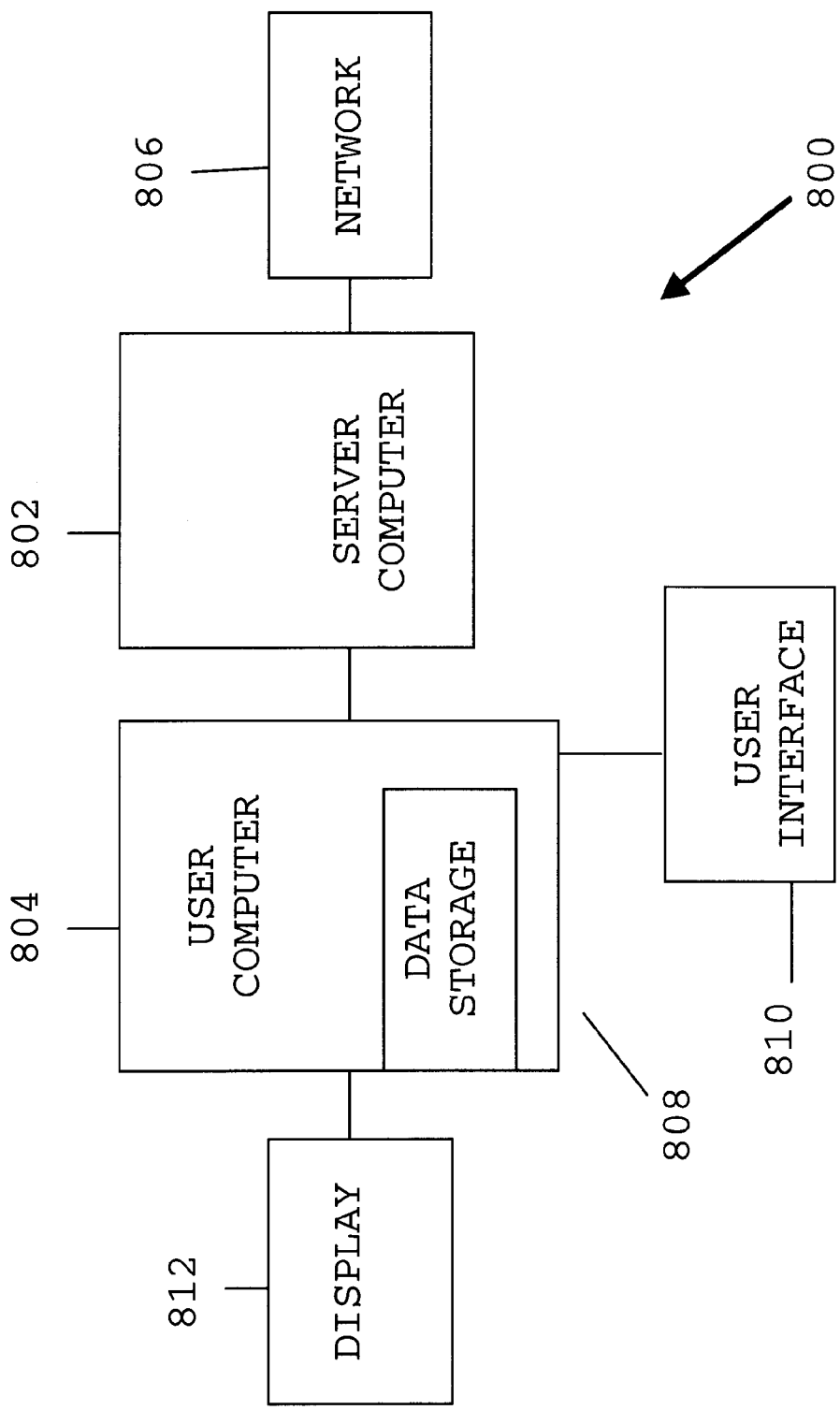
FIG. 8 illustrates a block diagram of an example of an apparatus incorporating features that may be used to practice aspects of the disclosed embodiments.

The disclosed embodiments may also include software and computer programs incorporating the process steps and instructions described above that are executed in different computers. FIG. 8 is a block diagram of one embodiment of a typical apparatus 800 incorporating features that may be used to practice aspects of the invention. As shown, a computer system 802 may be linked to another computer system 804, such that the computers 802 and 804 are capable of sending information to each other and receiving information from each other. In one embodiment, computer system 802 could include a server computer adapted to communicate with a network 806. Computer systems 802 and 804 can be linked together in any conventional manner including, for example, a modem, hard wire connection, or fiber optic link. Generally, information can be made available to both computer systems 802 and 804 using a communication protocol typically sent over a communication channel or through a dial-up connection on ISDN line. Computers 802 and 804 are generally adapted to utilize program storage devices embodying machine readable program source code which is adapted to cause the computers 802 and 804 to perform the method steps disclosed herein. The program storage devices incorporating aspects of the invention may be devised, made and used as a component of a machine utilizing optics, magnetic properties and/or electronics to perform the procedures and methods disclosed herein. In alternate embodiments, the program storage devices may include magnetic media such as a diskette or computer hard drive, which is readable and executable by a computer. In other alternate embodiments, the program storage devices could include optical disks, read-only-memory ("ROM") floppy disks and semiconductor materials and chips.

Computer systems 802 and 804 may also include a microprocessor for executing stored programs. Computer 802 may include a data storage device 808 on its program storage device for the storage of information and data. The computer program or software incorporating the processes and method steps incorporating aspects of the invention may be stored in one or more computers 802 and 804 on an otherwise conventional program storage device. In one embodiment, computers 802 and 804 may include a user interface 810, and a display interface 812 from which aspects of the invention can be accessed. The user interface 810 and the display interface 812 can be adapted to allow the input of queries and commands to the system, as well as present the results of the commands and queries.

Figure 9:
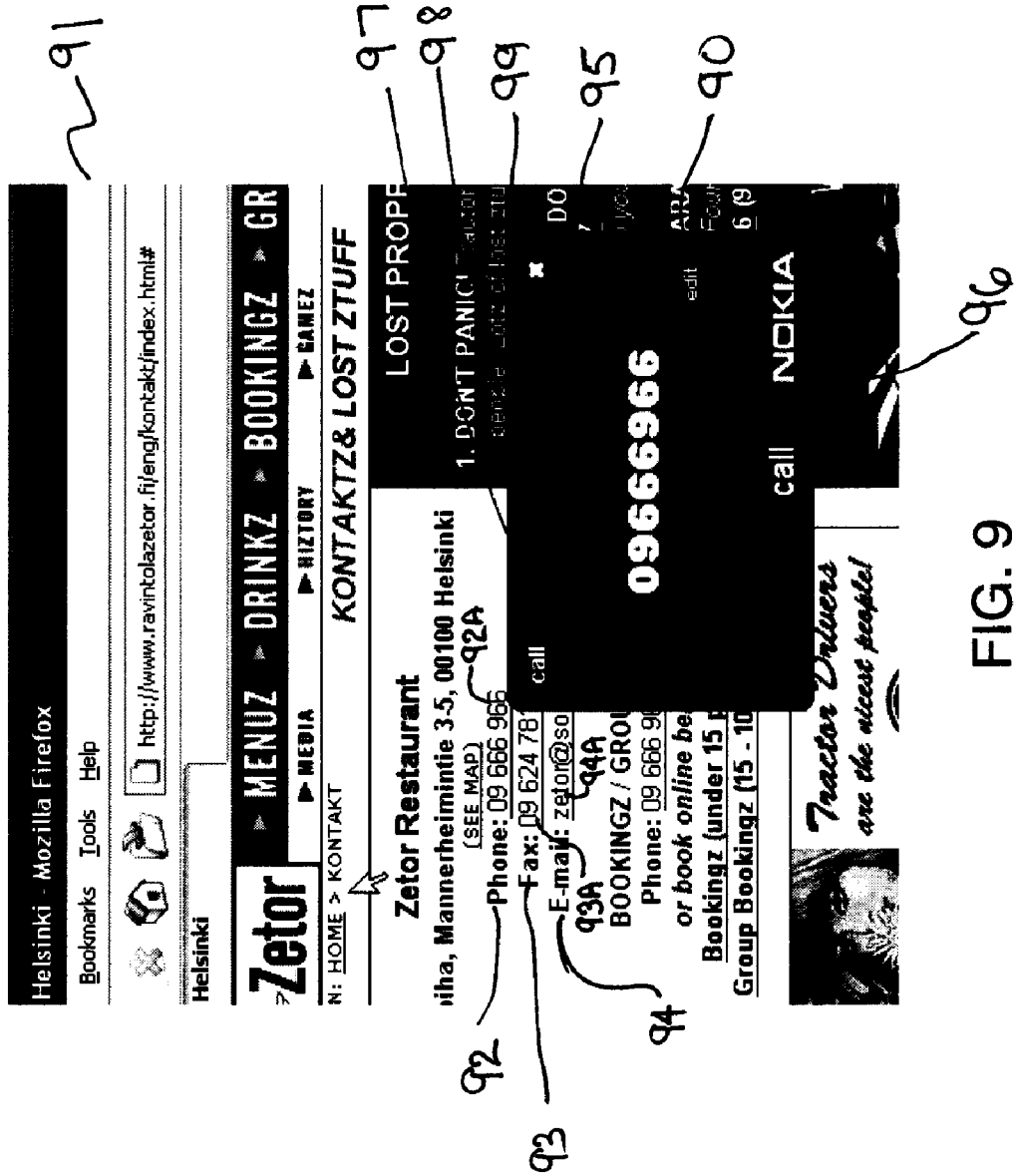
FIG. 9 is a screen shot of one example of a user interface incorporating features of the disclosed embodiments.

Referring to FIG. 9, a screen shot of a user interface is shown, illustrating an example of the disclosed embodiments. The user has navigated to a web page 91 for a restaurant. As the web page is rendered to the user's device 16, each contact information 92, 93 and 94 is highlighted by activatable links 92A, 92B and 92C, respectively.

After clicking on phone number 92 on the web page 91, a layer 95 is rendered on top of the page 91. This is one example implementation of the user interface of the disclosed embodiments. If the plug-in 13 was not used, the phone numbers would not be underlined and there would not be any action on clicking the number. As discussed previously, instead of the links 92A, 92B and 92C, there could be a button in front of or after the number 92, and other contact 93, 94.

Referring again to FIG. 9, clicking the "call" button 96 in the bottom of the plug-in produced layer 95 will initiate the call. Clicking "SMS", "contact" or "preferences" link 97, 98, 99, on the upper part of the layer 95 will change the contents of the plug-in produced layer 95 accordingly.

Figure 10:
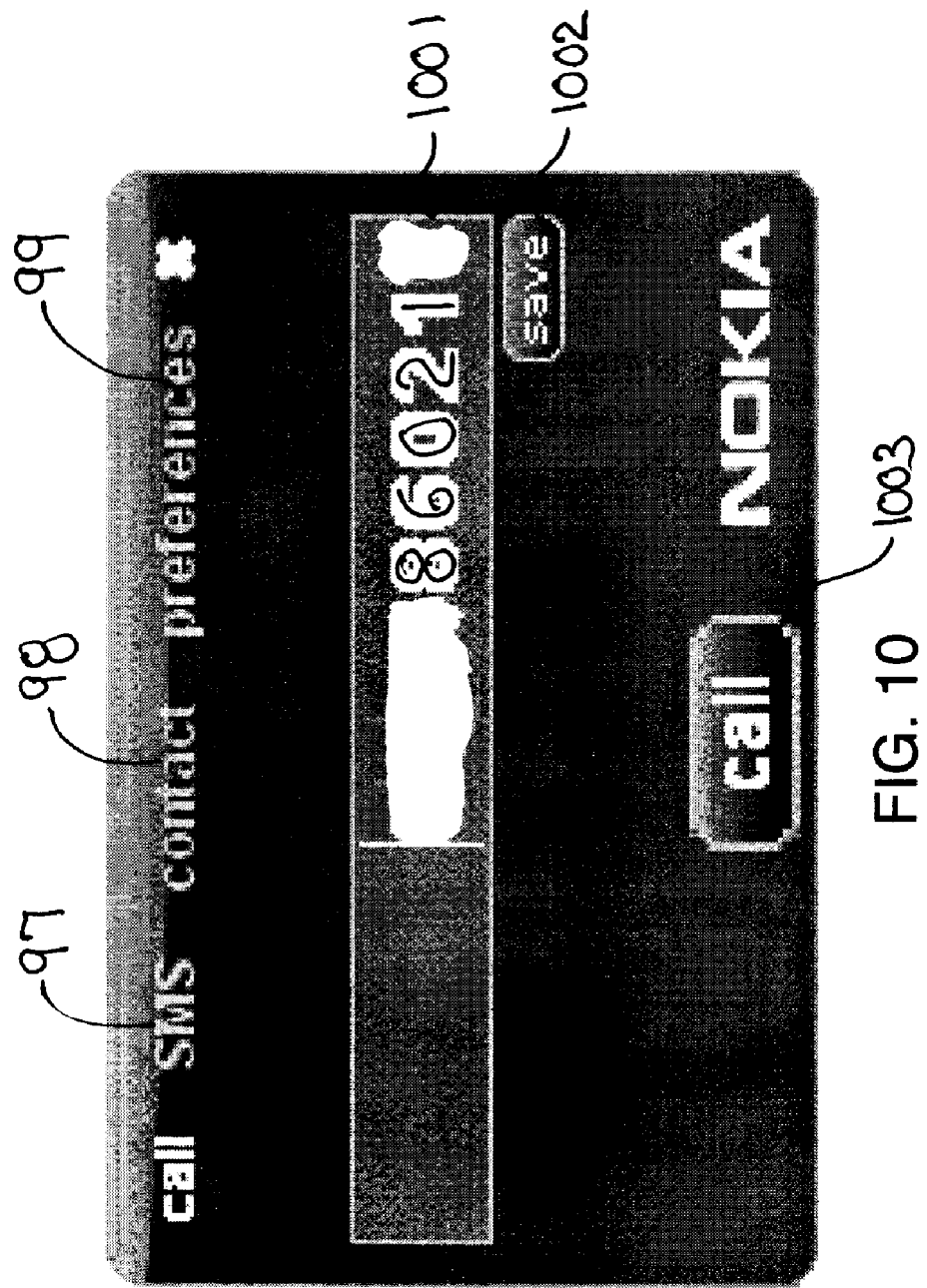
FIG. 10 is a screen shot of an example of a text editing mode of a user interface incorporating features of the disclosed embodiments.

Referring to FIGS. 9 and 10, in one embodiment, clicking the "edit" button 90 changes the number to a text field 1001 allowing editing the number prior to calling. This may be needed in the event a country code or area code needs to be added to the number prior to dialing, to satisfy location or geographical requirements or preferences. After the number is edited, the number can be saved by activating the "save" button 1002, or the number can be called by activating the "call" button 1003. The top section of the screen or layer 1005 displays the SMS 97, contact 98 and preferences 99 links.

Figure 11A:
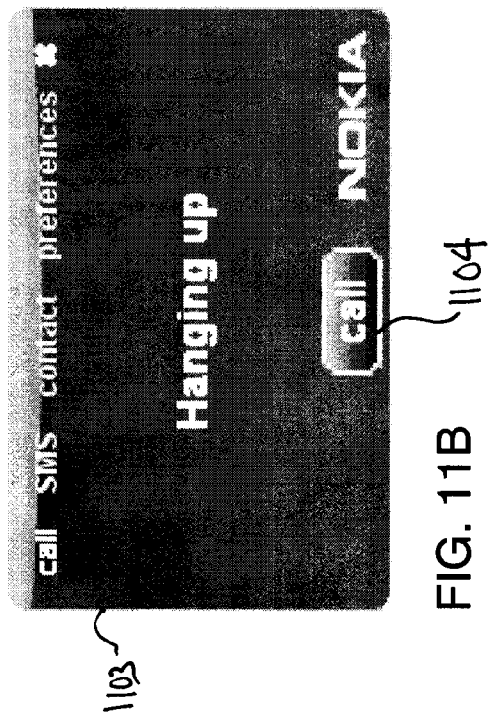
FIGS. 11A-11B are screen shots of examples of a call termination mode of a system incorporating features of the disclosed embodiments.
Figure 11B:
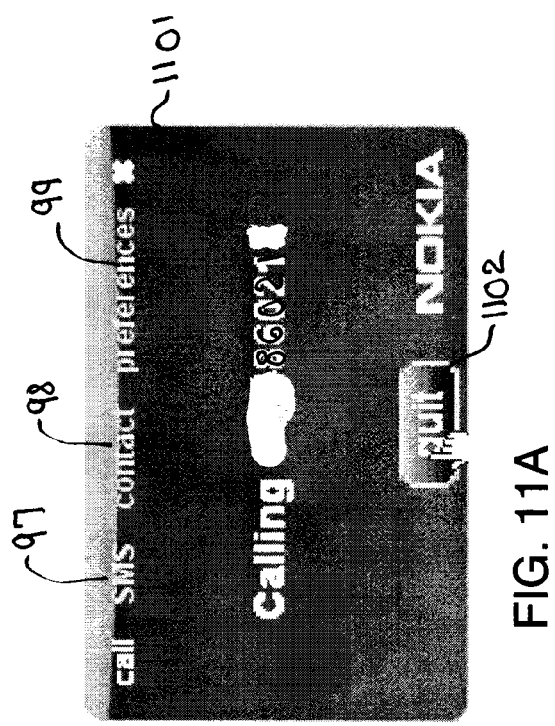
Figure 11C:
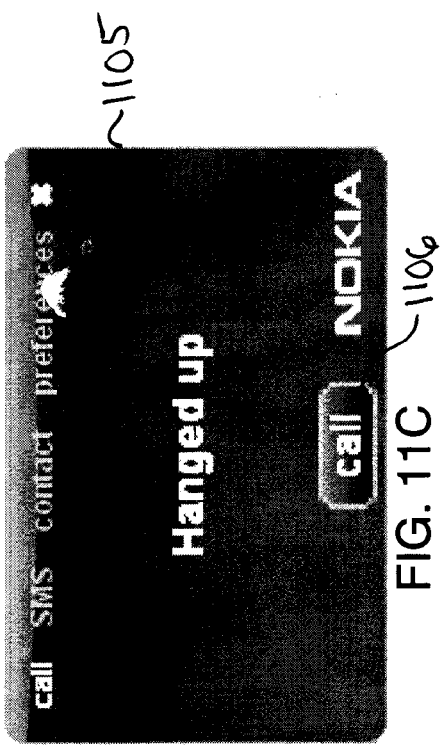

Referring to FIGS. 11A-11C, after clicking "call" button 96 of FIG. 9, the mobile device 16 is instructed to initiate a call to the selected number. Once the call is initiated, the user interface or layer 1101 shows a hang-up button ("quit") 1102. Clicking "quit" 1102, for example, will hang up or terminate the call. Layers 1103 and 1105 can illustrate the state of the call. Once the call is terminated or being terminated, the button 1102 can be reconfigured to be enabled to activate a call. In FIGS. 11B and 11C, the buttons 1104 and 1106 are "call" enabled. The user interface or layers 1101, 1103 and 1105 could also include other services or control features, such as for example, device volume or speaker ON-OFF controls.

Figures 12A, 12B, 12C:
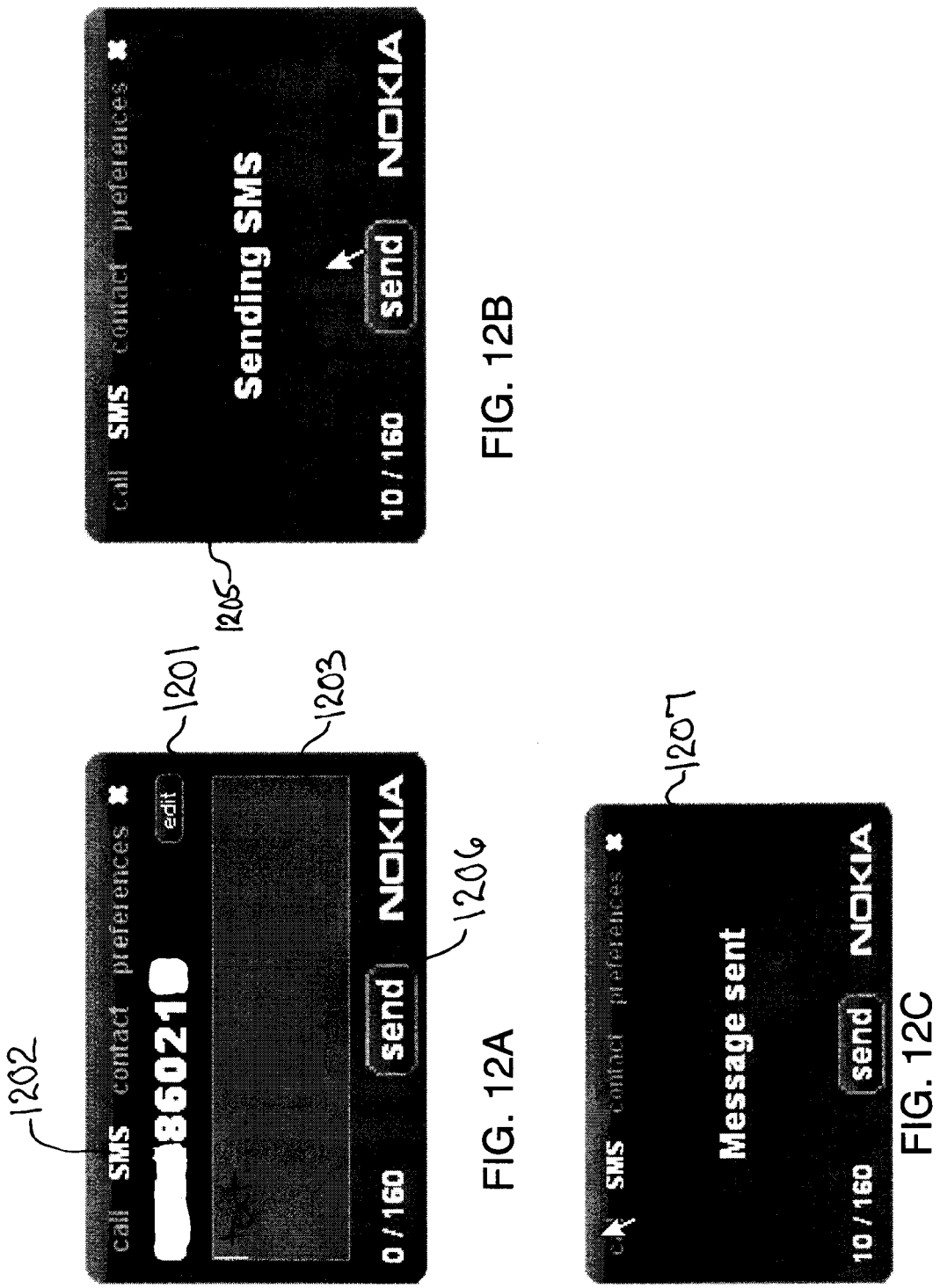
FIGS. 12A-12C are screen shots of examples of a SMS function in a system incorporating features of the disclosed embodiments.

FIGS. 12A-12C illustrate screen shots of the user interface layers 1201, for sending an SMS. After clicking the "SMS" link 1202 on the layer or screen 1201, the user interface layer 1201 provides a text box 1203 allowing the user to enter the message text. The number to send the SMS to can also be edited. In this implementation, the message length can be restricted to suitable character length, such as for example 160, or 1 SMS. In alternate embodiments, the message length can be any suitable length. For example, longer messages could be allowed and sent as a series of SMS. The user interface 1205 and 1207 can provide the user with information related to the status of the transmission of the SMS.

FIGS. 13A-13C illustrate one example of adding contacts. By activating the "contact" link 98 of the user interface layer 95 of FIG. 9, the user interface changes the view to a screen 1302 showing text boxes 1303, 1304 for first and last name, for example. In alternate embodiments, any suitable fields for information, and any number of text input boxes can be provided. Once the information is entered into the fields 1303, 1304, the "add" button 1305 is activated and the state of the adding is illustrated, 1306, 1307, in FIGS. 13B, 13C.

Figure 14:
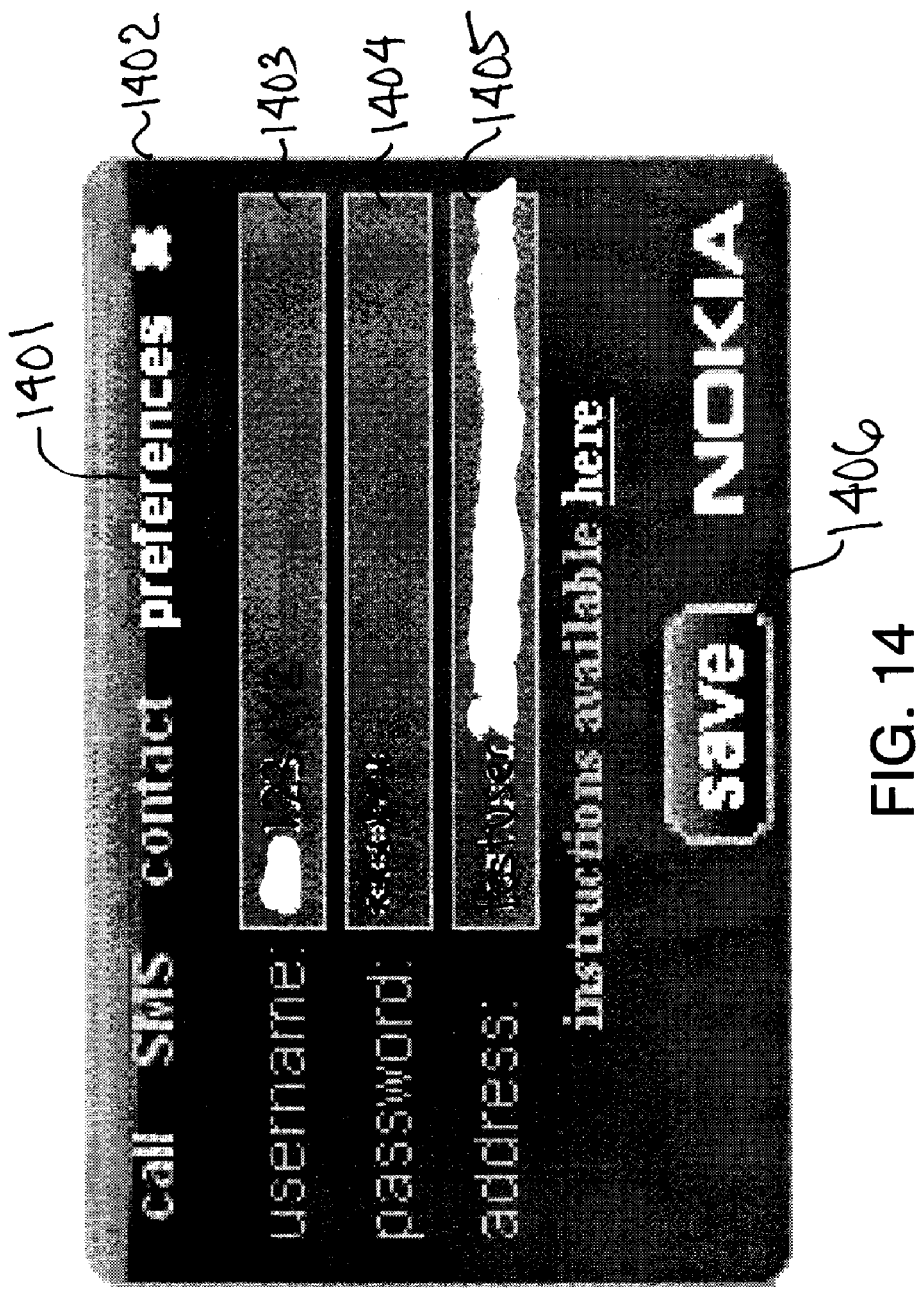
FIG. 14 is a screen shot of an example of a preference function in a system incorporating features of the disclosed embodiments.

In another embodiment, referring to FIG. 14, if the preferences icon 99 in FIG. 9 is activated, the preferences screen 1402 is presented on the user interface. The selection of the preferences function can be illustrated by highlighting the preferences icon 1401. In this example, fields 1403-1405 are provided for entering information, such as username, password and address. In alternate embodiments, any suitable information can be inputted and any number and size of text input boxes can be provided. This information can be stored in a storage offered by the browser, the plug-in configuration, or such other suitable storage medium or facility.

The disclosed embodiments generally provide for a user to be able to automatically place a call to a contact information found in a document, such as a web page, using a mobile device, without the need to manually manipulate the mobile device to input the contact information. Before a document is rendered to the requesting device, the document is parsed and any contact data in the document is extracted. The contact information is replaced with links that enable the user to automatically establish a communication link or send a communication to a contact associated with the contact information without having to manually input the contact information in the mobile device. When the user activates or clicks on a contact link, a command is automatically sent from the user's device, or browser plug-in, to the user's mobile device that executes a program to instantiate the communication to the target device or user. The user no longer needs to manipulate the mobile phone or dial a phone number shown on a document to place a call and the user can also write SMS using the keyboard of the computing device with which the user is browsing, and send the message from the mobile device.

It should be understood that the foregoing description is only illustrative of the embodiments. Various alternatives and modifications can be devised by those skilled in the art without departing from the embodiments. Accordingly, the disclosed embodiments are intended to embrace all such alternatives, modifications and variances that fall within the scope of the appended claims.

What is claimed is:

1. A method comprising:
   requesting a document using a browser of a computing device;
   parsing the document, prior to rendering the document to a display of the computing device, for any information comprising contact data;
   replacing each item of contact data with a communication link configured to be activated to enable the computing device to automatically initiate a communication from a mobile device using the contact data, wherein the computing device and the mobile device are separate devices; and
   causing rendering of the document with the communication link by the display of the computing device.

2. The method of claim 1 further comprising:
   activating the communication link representing a contact to enable communication to the contact from the mobile device.

3. The method of claim 2 wherein activating the communication link comprises permitting the computing device to send a command to a server running on the mobile device that causes the mobile device to initiate the communication to the contact.

4. The method of claim 3 wherein the communication is a phone call.

5. The method of claim 3 wherein the communication is short message service.

6. The method of claim 1 wherein the document is a Web page.

7. The method of claim 1 wherein the contact data is a phone number, a screen name or an email address.

8. The method of claim 1 further comprising causing storing of the item of contact data in a contacts application of the mobile device.

9. The method of claim 1 further comprising:
   extracting the contact data from the document;
   comparing the extracted contact data with data associated with a contacts application of the mobile device;
   identifying any additional contact information corresponding to the contact data that is not included in the data associated with the contacts application; and
   causing presentation of the additional contact information on a user interface of the computing device.

10. The method of claim 1 wherein the communication link comprises a call link, an icon, or a button on a user interface of the computing device.

11. The method of claim 1 further comprising, converting the communication link into a communication disconnect link, that when activated will end the communication.

12. The method of claim 1, further comprising:
   activating the communication link;
   selecting a message function of the computing device;
   causing displaying of a text input field on the document for the user to input text comprising a message; and
   causing displaying of a character calculating component that advises the user of a number of remaining characters.

13. The method of claim 1 further comprising:
activating a tool bar on a user interface of the computing device, the tool bar being linked to the mobile device; and
causing communication information to be retrieved from the mobile device to the computing device via the tool bar.

14. The method of claim 13 further comprising:
activating a control on the tool bar to reply to a message retrieved from the mobile device; and
preparing a reply on the computing device and transferring the reply to the mobile device for delivery to a recipient.

15. The method of claim 13 further comprising:
selecting an action from the tool bar;
causing sending of a request from the tool bar to a server running in the mobile device for a web page; and
causing the web page to be called and causing the web server to execute a program on the mobile device to carry out the selected action in the mobile device.

16. A method comprising:
extracting contact information from a web page requested by a browser application of a computing device in response to a web page call request;
converting the contact information into an activatable link prior to rendering the web page to the browser application of the computing device;
selecting an action from the activatable link on a user interface of a computing device, the action being a request for action from a mobile device;
causing a document to be called from a program communicating with the mobile device; and
automatically executing another program in the mobile device in response to the document call, the executing program performing the requested action.

17. The method of claim 16 wherein the requested action is a request to search a database of the mobile device for contact information, causing displaying of a received SMS in the mobile device, reviewing a call log of the mobile device, causing a reply to a SMS, or causing a reply to a call in the call log.

18. The method of claim 16 wherein the link is a phone number of a contact and activation of the link is a request to establish a communication line with the contact.

19. The method of claim 16 wherein extracting contact information includes extracting contact information, the contact information being a phone number.

20. The method of claim 19 further comprising activating the link in order to establish a voice call via the at least one phone number.

21. The method of claim 19 further comprising preparing a message on the computing device to be transmitted to a recipient via the at least one phone number, and activating the link in order to send the message to the mobile device for transmission to the recipient via the at least one phone number.

22. The method of claim 19 further comprising automatically causing storing of the at least one phone number in a contacts application of the mobile device when the link is activated via the computing device.

23. An apparatus comprising at least one processor and at least one memory including computer program code, the at least one memory and the computer program code configured to, with the at least one processor, direct the apparatus at least to:

extract at least one contact data from a document;
generate at least one activatable communication link corresponding to the at least one contact data for presentation on a display of a computing device;
cause establishment of a connection pathway from the computing device to a mobile device, wherein the computing device and the mobile device are separate devices; and
activate the at least one activatable link on the computing device to establish a communication connection with a contact associated with the at least one contact data via the mobile device.

24. The apparatus of claim 23, wherein the apparatus is further directed to cause displaying of a text input field on the display, the text input field configured for receiving character inputs corresponding to a message to be sent to the contact via the mobile device.

25. The apparatus of claim 23, wherein the apparatus is further directed to cause displaying of a tool bar that is configured to provide action requests to the mobile device.

26. An apparatus comprising:
means for extracting contact information from a document;
means for converting the extracted contact information into an activatable communication link;
means for causing displaying of the activatable communication link on a display of a computing device;
means for receiving a selection of the activatable communication links by the computing device; and
means for causing establishment of a communication connection with a contact associated with the selected activatable communication link via a mobile device, wherein the computing device and the mobile device are separate devices.

27. The apparatus of claim 26 further comprising means for establishing a message to be sent to the contact and means for causing transmission of the message from the computing device to the mobile device for transmission to the contact.

28. The apparatus of claim 26 further comprising:
means for comparing contact information of the selected activatable communication link with contact details stored in association with a contacts application;
means for extracting additional contact information in an instance in which a match with the stored contact details is found;
means for causing presentation of one or more additional activatable communication links corresponding to the extracted additional contact information; and
means for activating one of the one or more additional activatable communication links to establish a communication connection with the contact using the additional contact information.

29. The apparatus of claim 26 further comprising means for causing storing of the extracted contact information in a contacts application.

30. A computer program product comprising:
a computer useable medium having computer readable code embodied therein for directing a processor to:
request a document using a browser of a computing device;
parse the document, prior to rendering the document to a display of the computing device, for any information comprising contact data;
cause replacement of an item of contact data with a communication link configured to be activated and enable the computing device to automatically initiate a communication from a mobile device using the contact data, wherein the computing device and the mobile device are separate devices; and cause rendering of the document with the communication link by the display of the computing device.

31. The computer program product of claim 30 further comprising computer readable program code for directing the processor to activate the communication link to establish the communication with the contact from the mobile device.

32. The computer program product of claim 30 further comprising computer readable program code for directing the processor to cause sending of a command to a server running on the mobile device to cause the mobile device to initiate the communication with the contact.

33. The computer program product of claim 30 further comprising computer readable program code for directing the processor to perform:

extracting the contact data from the document;

comparing the extracted contact data with data associated with a contacts application of the mobile device;

identifying any additional contact information corresponding to the contact data that is not included in the data associated with the contacts application; and causing presentation of the additional contact information on the display of the computing device.

34. The computer program product of claim 30 further comprising computer readable program code for directing the processor to activate the link to initiate the communication;

select a message function of the computing device;

cause displaying of a text input field on the document for the user to input text comprising a message; and cause displaying of a character calculating component indicating a number of remaining characters.

* * * * *